United States Patent [19]

Hetherington

[11] 4,109,303

[45] Aug. 22, 1978

[54] FLUORESCENT LIGHT FIXTURE

[75] Inventor: Joseph F. Hetherington, Levittown, Pa.

[73] Assignee: Joseph F. Hetherington, Levittown, Pa.

[21] Appl. No.: 708,647

[22] Filed: Jul. 26, 1976

[51] Int. Cl.² .......................................... H05B 33/02
[52] U.S. Cl. .................................................. 362/216
[58] Field of Search ..................... 240/51.12, 51.11 R, 240/2 D; 151/38; 362/216

[56] References Cited

U.S. PATENT DOCUMENTS

| 2,472,597 | 6/1949 | Levy | 240/51.12 |
| 2,534,955 | 12/1950 | Dazley | 240/51.12 |
| 2,543,713 | 2/1951 | Yeager | 240/51.12 |
| 2,590,896 | 4/1952 | Seele | 151/38 X |
| 2,713,115 | 7/1955 | Archer | 240/51.12 |
| 2,878,372 | 3/1959 | Fry | 240/51.12 |
| 2,943,238 | 6/1960 | Reaves | 240/51.12 X |

FOREIGN PATENT DOCUMENTS 1,037,344  0000  France ................... 240/51.12

Primary Examiner—Donald A. Griffin
Attorney, Agent, or Firm—Oblon, Fisher, Spivak, McClelland & Maier

[57] ABSTRACT

A fluorescent light fixture accommodates a circular type fluorescent light element, or alternatively, a plurality of concentrically disposed circular type fluorescent light elements which may be readily mounted upon the fixture in order to alter the wattage rating of the same as desired. A translucent, substantially rigid, yet somewhat flexible, flat mounting plate has a conventional electrical ballast member mounted upon one side or surface thereof and similarly has a conventional, incandescent type lamp plug mounted upon the other side or surface thereof, the plug being electrically connected to the ballast member which is, in turn, electrically connected to the fluorescent light elements. The mounting plate has a substantially square-type configuration the corners of which are permanently deformed so as to integrally form flexible and resilient clip or clamping members for removably retaining the fluorescent elements upon the fixture, the elements being snapped thereinto. As a result of the provision of the flat mounting plate, and the mounted interrelationship between the same and the ballast and plug members, the fixture is particularly adaptable to be mounted upon a supporting surface in a flush manner whereby the light elements are able to be disposed immediately adjacent such surface and disposed parallel thereto.

11 Claims, 6 Drawing Figures

FLUORESCENT LIGHT FIXTURE

BACKGROUND OF THE INVENTION

1. Field of the Invention

The present invention relates generally to fluorescent light fixtures, and more particularly to a fluorescent light fixture which accommodates a circular type fluorescent light element, or alternatively, a plurality of concentrically disposed circular type fluorescent light elements, and which may be operatively connected to a conventional screw-threaded socket, such as, for example, that of an incandescent lamp fixture, while being stably mounted upon a supporting surface in a flush manner such that the fluorescent light element is disposed immediately adjacent the supporting surface and disposed parallel thereto.

2. Description of the Prior Art

While circular type fluorescent light elements are of course well-known, and still further, while apparatus is additionally well-known for operatively connecting such light elements with conventional screw-threaded sockets, such as, for example, those commonly associated with incandescent lamp fixtures, there is a substantial need for a fixture of the aforenoted type which is compact, easy to assemble, and may be readily mounted in a stable manner upon a support surface in a flush manner such that the fluorescent light element is disposed immediately adjacent the supporting surface and disposed parallel thereto.

More particularly, in conventional fluorescent light fixtures of the afore-noted type, the circular fluorescent light element is usually suspended, by means of spring clip type elements, from an electrical ballast or transformer housing, however, there is normally no provision within such apparatus for mounting the entire fixture upon a supporting surface, the fixture being suspendingly supported solely by means of the threaded engagement between the conventional screw-threaded male plug and the screw-threaded socket into which the plug is threadedly inserted.

Still further, other conventional fixtures have non-planar surfaces disposed immediately adjacent the screw-threaded male plug member and consequently, upon threaded engagement of the plug with the screw-threaded socket, the fixture is not able to be stably supported or mounted upon a supporting surface. Still yet further, the electrical ballast or transformer housing is normally interposed between the plane of the fluorescent light element and the screw-threaded male plug, or alternatively, projects beyond the plane of the light element toward the disposition of the male plug, so as to similarly prevent the flush mounting of the fixture upon a supporting surface and the disposition of the light element immediately adjacent the supporting surface and parallel thereto.

SUMMARY OF THE INVENTION

Accordingly, it is an object of the present invention to provide a new and improved fluorescent light fixture.

Another object of the present invention is to provide a new and improved fluorescent light fixture which overcomes the aforenoted drawbacks of conventional light fixtures.

Still another object of the present invention is to provide a new and improved fluorescent light fixture which is particularly adaptable for housing circular fluorescent light elements.

Yet another object of the present invention is to provide a new and improved fluorescent light fixture which can house a plurality of circular fluorescent light elements in a concentric arrangement.

Still yet another object of the present invention is to provide a new and improved fluorescent light fixture which enables the same to be operatively connected with a conventional screw-threaded female socket of the type normally employed for housing incandescent lamp elements.

Yet still another object of the present invention is to provide a new and improved fluorescent light fixture which enables the same to be operatively connected with a conventional screw-threaded female socket and which facilitates the stable mounting of the fixture upon a supporting surface in a flush manner such that the fluorescent light element is disposed immediately adjacent the supporting surface and parallel thereto.

A further object of the present invention is to provide a new and improved fluorescent light fixture which includes a minimum number of component parts which thereby facilitates the rapid and simple assembly thereof.

A still further object of the present invention is to provide a new and improved fluorescent light fixture the structural components of which are disposed relative to one another in an extremely compact manner.

A yet further object of the present invention is to provide a new and improved fluorescent light fixture which permits standard fixture components to be employed therein or operatively connected therewith.

A still yet further object of the present invention is to provide a new and improved fluorescent light fixture which is relatively inexpensive to fabricate.

An additional object of the present invention is to provide a new and improved fluorescent light fixture which is highly efficient in the quantity of light emitted.

The foregoing and other objects are achieved in accordance with the present invention through the provision of a fluorescent light fixture which includes a circular type fluorescent light element, or alternatively, a plurality of concentrically disposed circular type fluorescent light elements which may be readily mounted upon the fixture in order to alter the wattage rating of the same as desired. A translucent, substantially rigid, yet somewhat flexible, flat mounting plate has a conventional electrical ballast member mounted upon one side or surface thereof and similarly has a conventional incandescent type lamp plug mounted upon the other side or surface thereof, the plug being electrically connected to the ballast member which is, in turn, electrically connected to the fluorescent light elements. The mounting plate has a substantially square-type configuration the corners of which are permanently deformed so as to integrally form flexible and resilient clip or clamping members for removably retaining the fluorescent elements upon the fixture, the elements being snapped thereinto. As a result of the provision of the flat mounting plate, and the mounted interrelationship between the same and the ballast and plug members, the fixture is particularly adaptable to be mounted upon a supporting surface in a flush manner whereby the light elements are able to be disposed immediately adjacent such surface and disposed parallel thereto.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE ILLUSTRATED EMBODIMENTS

Figure 2:
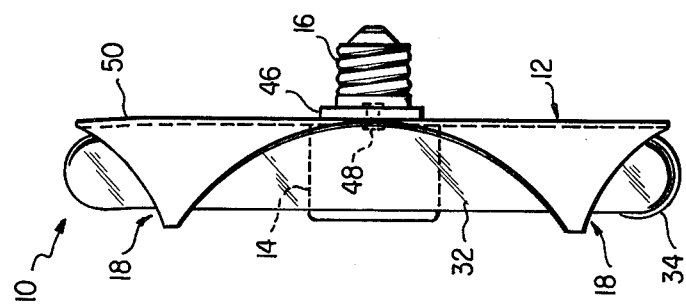
FIG. 2 is a side elevation view of the fixture of FIG. 1.
Figure 1:
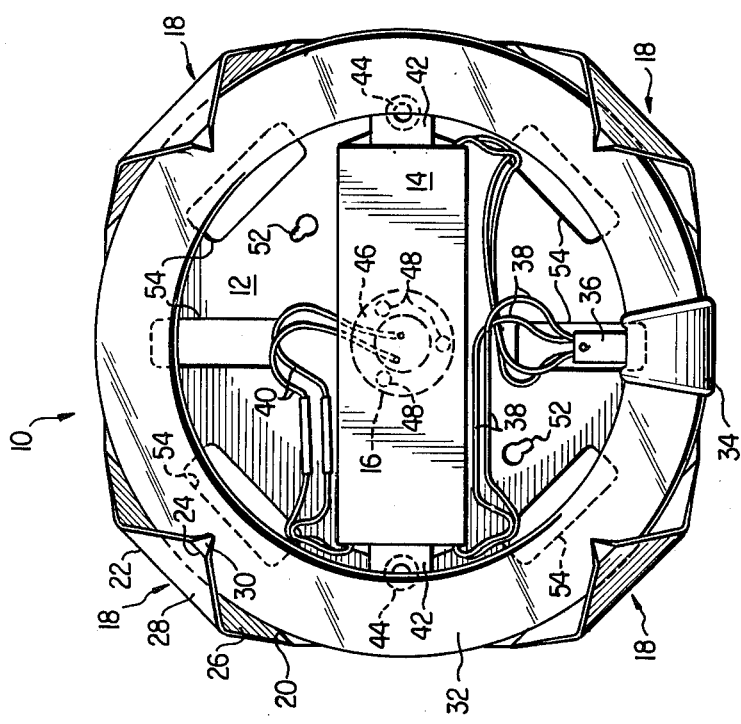
FIG. 1 is a front elevation view of one embodiment of a fluorescent light fixture constructed in accordance with the present invention and showing its cooperative parts.

Referring now to the drawings, and more particularly to FIGS. 1 and 2 thereof, there is disclosed a fluorescent light fixture, generally indicated by the reference character 10, which includes a flat, supporting base plate 12 having a conventional, electrical ballast member 14, of a rectangular parallelepiped configuration, fixedly mounted upon the front side or surface thereof while a conventional screw-threaded, incandescent type lamp plug 16 is similarly fixedly mounted upon the rear side or surface thereof, plug 16 being of course adapted for threaded engagement with a conventional, screw-threaded incandescent type lamp socket, not shown.

The base plate 12 is fabricated of molded, polycarbonate plastic, and is seen to have a square configuration with the corners 18 thereof permanently deformed in a forwardly projecting manner along three, successively disposed, radially spaced fold lines 20, 22, and 24 which respectively define three, successive, integrally connected, angled portions 26, 28, and 30, the latter portions 30 being forwardly spaced from and disposed substantially parallel to the principal portion 31 of plate 12, upon which ballast member 14 and plug 16 are mounted, so as to define an annular socket therewith.

As the plate 12 is substantially rigid in order to provide sufficient support for members 14 and 16, as well as to facilitate the mounting of the fixture upon a supporting surface, yet the same is also somewhat flexible, and as the corner portions 18 are, in effect, cantilevered from and with respect to the principal portion 31 of plate 12, portions 18 form flexible and resilient clip members which are adapted to removably secure, in a snap-in fashion, a circular, fluorescent tube 32 within the socket defined between portions 30 and 31, tube 32 having of course a smaller diameter than the distance defined between diametrically disposed clip portions 26 yet having a larger diameter than the distance defined between diametrically disposed clip portions 28 and 30, the latter portions also overlapping the upper surface of tube 32 so as to in fact retain the same within the aforenoted annular socket.

Tube 32 is a conventional, circular fluorescent tube having separated ends, not shown, which are conventionally connected together by means of a fitting 34 which houses therein the terminals, not shown, of the tube 32 and which also includes four suitable electrical connector pins, also not shown, for facilitating the electrical connection with a four-prong receptacle socket plug 36. A suitable number of electrical conductors or wires 38 provide an electrical connection between the electrical connectors of fitting 34 and plug 36, and the ballast member 14, and in a similar fashion, ballast member 14 is likewise electrically connected to plug 16 by means of electrical conductors 40.

Ballast 14 is a standard component, being either of the pre-heat or rapid start design, and includes mounting tab members 42 integrally fixed at its opposite ends whereby ballast 14 may be fixedly secured to plate 12 by means of suitable fasteners passing through tabs 42, such as, for example, rivets 44, which are disposed 6 inches apart, for example, so as to in fact accommodate a standard ballast. In a similar manner, plug 16 includes a flanged base 46 whereby plug 16 may likewise be secured to plate 12 by means of rivets 48.

As noted hereinabove, plate 12 is made of polycarbonate plastic which is translucent and has a 47% transmissivity factor, and is preferably white in color so as to add to the reflective properties thereof. In addition, as light is able to be transmitted therethrough, the fact that the clips 18 thereof overlap portions of the fluorescent tube 32 does not adversely affect the transmissivity of the light and such structures also do not cause shadows to be generated as is a problem with conventional, metal spring clip structures.

As is apparent from FIG. 2, the rear surface 50 of plate 12 is flat which serves to permit the entire fixture to be stably mounted upon a supporting surface, such as, for example, a wall or the ceiling of a particular room or chamber, or alternatively, an electrical box, provision of course being made for plug 16 in a conventional manner, and in order to in fact provide for such mounting of the fixture, plate 12 is provided with key-hole type mounting holes or slots 52. It is further seen that plate 12 is also provided with a plurality of rectangular apertures 54, disposed equiangularly about the fixture upon opposite sides of the diametrical plane of ballast member 14, which serve the dual functions of facilitating the discharge of heat generated by the light element 32 as well as the definition of raceways for electrical wiring 38 and 40.

Figure 4:
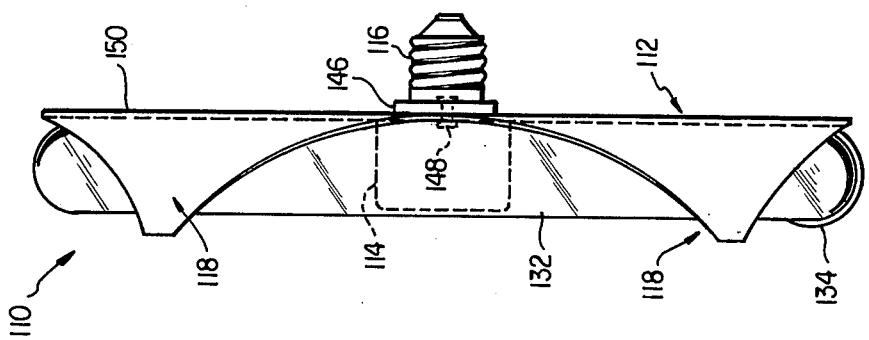
FIG. 4 is a view similar to that of FIG. 2, showing however, the embodiment of FIG. 3.
Figure 3:
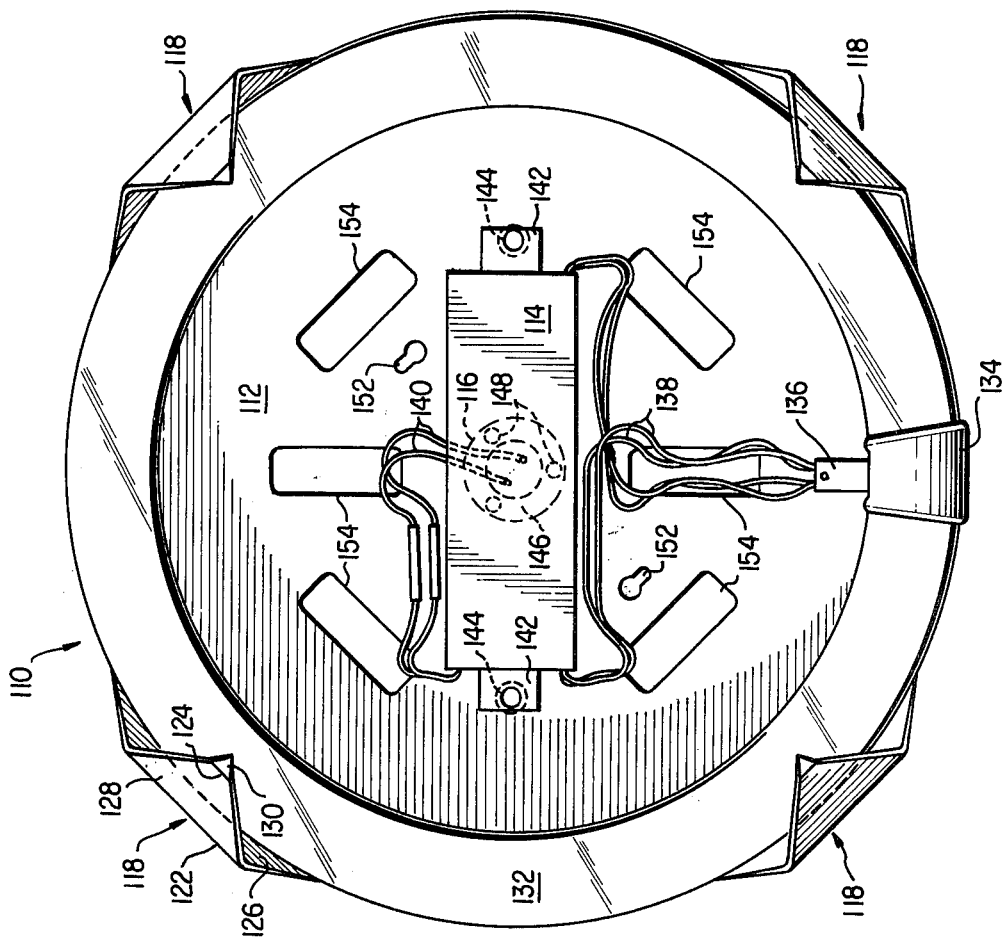
FIG. 3 is a view similar to that of FIG. 1, showing however, another embodiment of the fixture of the present invention which is adapted to house a light element of larger diameter and wattage.

Referring now to FIGS. 3 and 4, the structure of the fixture 110 disclosed therein is precisely the same as that of the fixture 10 of FIGS. 1 and 2, with corresponding parts having similar reference characters within a 100 series, with the exception that the base plate 112 is larger than that of plate 12 in order to accommodate fluorescent tube 132 which is larger in diameter than that of tube 32 and which also has a higher wattage rating than that of tube 32.

Figure 6:
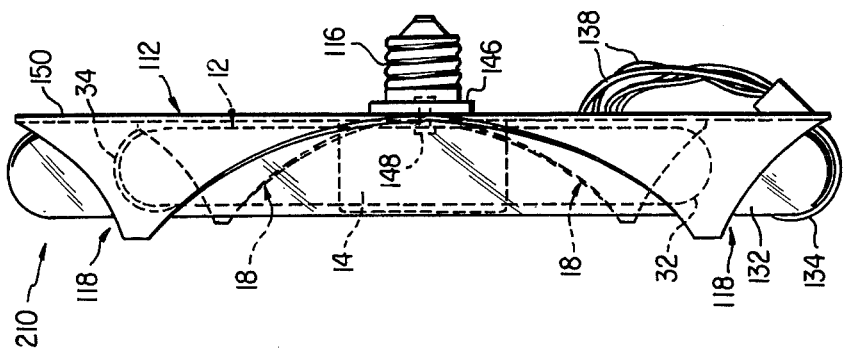
FIG. 6 is a view similar to that of FIG. 2, showing however, the embodiment of FIG. 5.
Figure 5:
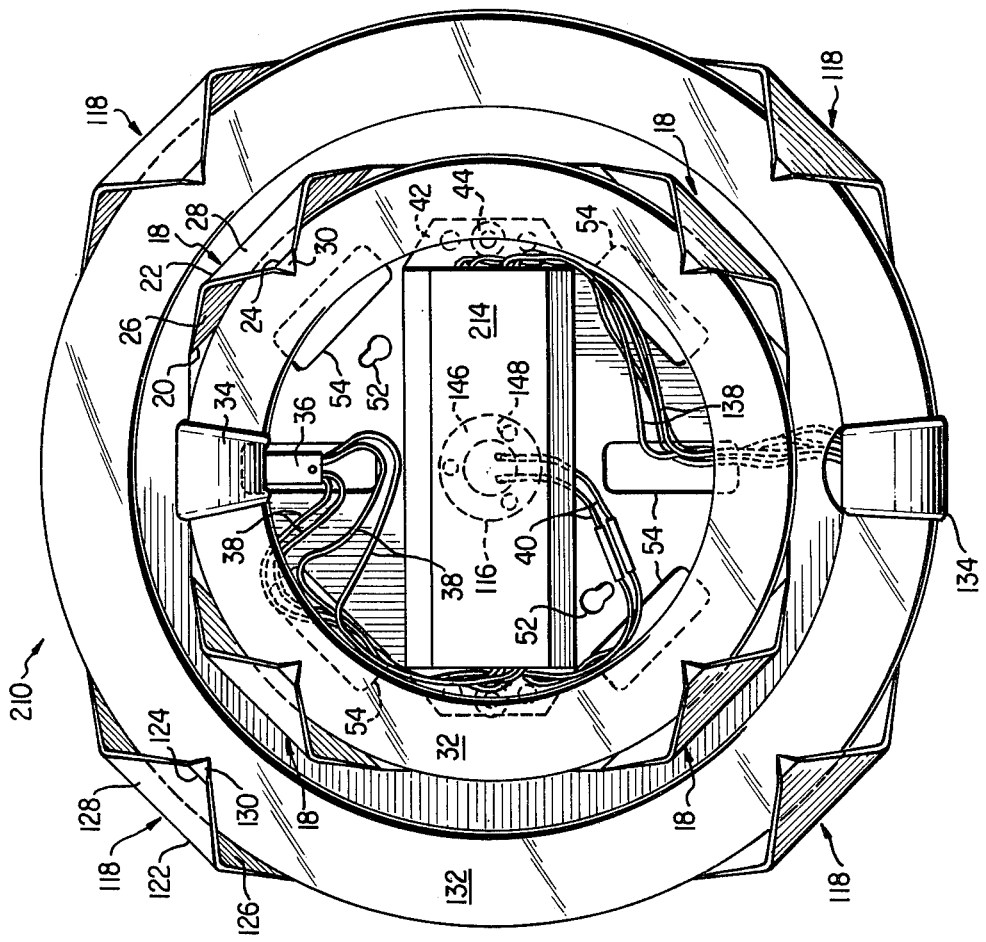
FIG. 5 is a view similar to that of FIG. 1, showing however, another embodiment of the fixture of the present invention which is adapted to simultaneously house the light elements of the embodiments of FIGS. 1 and 3 so as to provide a light element of still larger wattage.

In a similar manner, with particular reference being made to FIGS. 5 and 6, the fixture 210 disclosed therein is a composite fixture of fixtures 10 and 110 wherein, simply, base plate 112 is mounted rearwardly of base plate 12 with ballast member 214 being mounted upon the front surface of plate 12 while plug 116 is mounted upon the rear surface of plate 112, it being appreciated that ballast member 214 has terminals, not shown, for accommodating wiring 38 as well as wiring 138. In this manner, the fixture of FIGS. 5 and 6 may have a wattage rating equal to the combined wattage ratings of fixtures 10 and 100.

It is noted that the thickness profile or depth of the entire fixture, including the maximum thickness of the supporting base plate and the fluorescent tube is only approximately 1 5/16 inches, and consequently, such permits the fixture of the present invention to be mounted in existing incandescent fixtures otherwise made impossible with thicker profiles, and in addition facilitates the use of diffuser covers with a minimum depth which are considered to be standard to the incandescent fixture manufacture. Diffuser lock-up is in fact able to be accomplished utilizing a standard 4 1/4 inch cross-bar, and the same is able to be attached directly to the fixture body or optionally to the electrical box upon which the same is affixed, utilizing machine screws and spacers.

Thus, it may be seen that the fluorescent light fixture of the present invention has important advantages over the known prior art structures in that through means of the single supporting base plate, both the ballast member and the incandescent type screw threaded type plug may be simply fixedly mounted thereon. In addition, the circular fluorescent tube may be simply removably mounted thereon without the requirement of auxiliary clip structures and still further, the entire assembled fixture may be fixedly mounted in a flush manner, upon a supporting surface as a result of the flat, planar structure of the base plate and the provision of mounting means therein. Furthermore, as a result of the aforenoted assembly, the cost of the apparatus is greatly reduced as is the labor costs involved in fabricating the completed fixture.

Obviously, many modifications and variations of the present invention are possible in light of the above teachings. It is to be understood therefore that within the scope of the appended claims, the present invention may be practiced otherwise than as specifically described herein.

What is claimed as new and desired to be secured by Letters Patent of the United States is:

1. A fluorescent light fixture adapted to be mechanically connected to an internally threaded incandescent-type lamp socket disposed within means having a planar supporting surface, comprising:
   an externally threaded incandescent-type lamp plug for threadedly-engaging said socket;
   an electrical ballast member electrically connected to said plug;
   at least one fluorescent light element electrically connected to said ballast member; and
   means for mounting and supporting said plug, said ballast member, and said fluroescent light element upon at least one surface thereof, the surface upon which said plug is mounted being planar, wherein said mounting means comprises a flat plate which includes means integral therewith for mounting and supporting said light element thereon and wherein said plate has a square configuration, and is fabricated of a semi-rigid, flexible, and resilient plastic, the corners of said square plate being permanently deformed so as to overlap the remaining base portion of said plate in a spaced relationship therewith and thereby define therewith a socket within which said light element may be disposed.
   whereby said integral mounting means comprises said deformed corner portions which thereby define semi-rigid, flexible and resilient clip members overlapping said light element so as to removably secure said light element witin said socket in a snap-in fashion and whereby when said plug is threadedly engaged with said socket, said planar surface of said mounting means is able to be stably mounted upon said supporting surface in a flush manner.

2. A fluorescent light fixture as set forth in claim 1, wherein:
   a plurality of fluorescent light elements are mounted upon said mounting means.

3. A fluorescent light fixture as set forth in claim 2, wherein:
   said light elements are removably mounted upon said mounting means so as to selectively alter the power output rating of said fixture.

4. A fluorescent light fixture as set forth in claim 2, wherein:
   said light elements are circular and are mounted concentrically upon said mounting means.

5. A fluorescent light fixture as set forth in claim 1, wherein:
   said plastic is a translucent plastic,
   whereby light is able to be transmitted from said light element through said clip members so as not to cast shadows.

6. A fluorescent light fixture as set forth in claim 1, wherein:
   said mounting means includes means for mounting said mounting means upon said supporting surface.

7. A fluorescent light fixture as set forth in claim 1, wherein:
   said mounting means includes means defining wire raceways for the electrical conductors electrically connecting said plug, said ballast member, and said light element.

8. A fluorescent light fixture as set forth in claim 1, wherein:
   said mounting means includes heat dissipating means.

9. A fluorescent light fixture as set forth in claim 1, wherein:
   said ballast member and said light element are mounted upon one surface of said plate while said incandescent plug is mounted upon the other surface of said plate.

10. A fluorescent light fixture adapted to be mechanically connected to an internally threaded incandescent-type lamp socket disposed within means having a planar supporting surface, comprising:
    an externally threaded incandescent-type lamp plug for threadedly-engaging said socket;
    an electrical ballast member electrically connected to said plug;
    a first and second fluorescent light element electrically connected to said ballast member; and
    first and second mounting members for supporting said plug, said ballast member, and said fluorescent light elements upon at least one surface thereof, the surface upon which said plug is mounted being planar and wherein said second mounting member is mounted rearwardly of said first mounting member,
    whereby when said plug is threadedly engaged with said socket, said planar surface of said mounting means is able to be stably mounted upon said supporting surface in a flush manner wherein said first and second mounting members are flat plates.

11. A fluorescent light fixture as set forth in claim 10, wherein:
    said ballast member is mounted upon the front surface of said first plate and said plug is mounted upon the rear surface of said second plate.

* * * * *